Oct. 26, 1948.  A. H. ERICSSON  2,452,445
BREAD CUTTING BOARD WITH CRUMB TRAY
Filed June 4, 1945
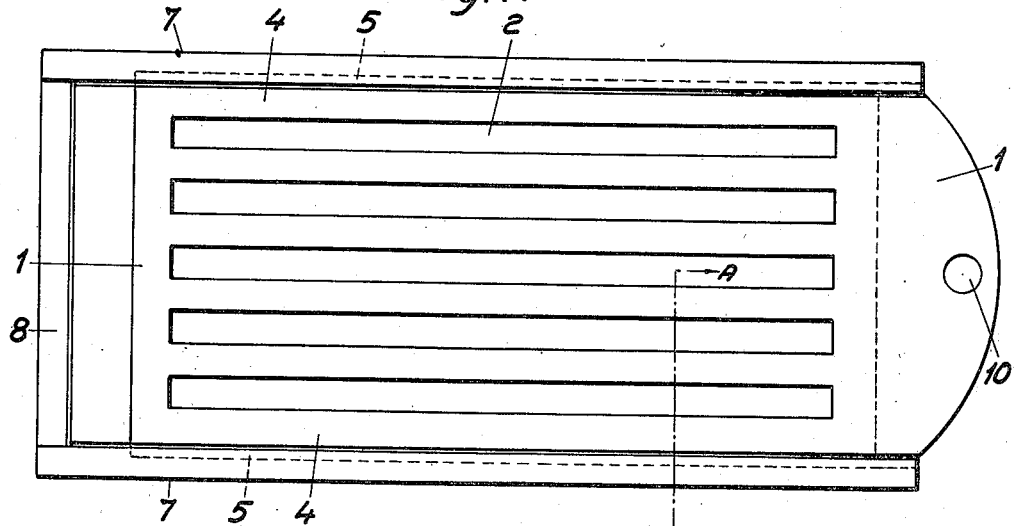
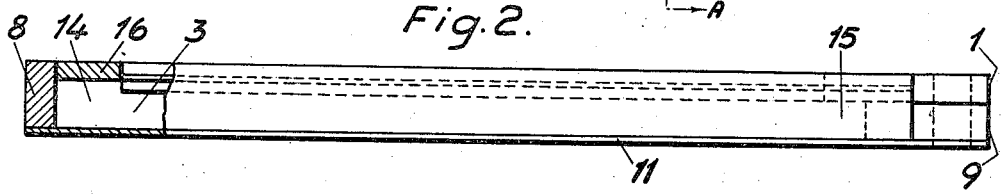
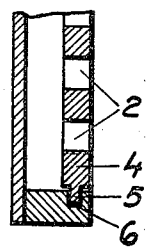 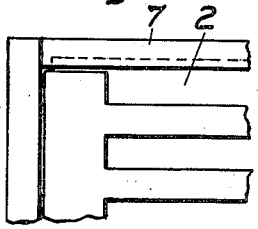 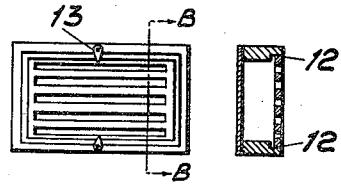
Inventor:
Arnold H. Ericsson,
By Richardson & David,
Attorneys Patented Oct. 26, 1948

2,452,445

UNITED STATES PATENT OFFICE 2,452,445

BREAD CUTTING BOARD WITH CRUMB TRAY

Arnold Halfdan Ericsson, Jarna, Sweden

Application June 4, 1945, Serial No. 597,413
In Sweden April 23, 1945

2 Claims. (Cl. 146—215)

The present invention relates to a cutting board for bread or the like.

The cutting board according to the invention is substantially characterized by the fact that it is provided with a detachable, slidable cutting plate having recesses arranged in such a way that a grid-shaped cutting plate is formed, as well as with a box located at a suitable distance from the underside of the said grid-shaped cutting plate, in which box bread crumbs or the like fall down and can be gathered.

Cutting boards of the types hitherto used have generally consisted of a flat, oblong plate. Anybody knows that when bread or the like is cut on such cutting boards a great many crumbs get loose which spread on and around the cutting board. This unintentional spreading of crumbs on tables and so on entails a certain work for the collection of the crumbs and for cleaning.

The object of the present invention is to provide a new and novel bread cutting board and crumb tray. An embodiment of the invention is shown by way of example on the accompanynig drawing.

Fig. 1 shows a cutting board viewed from above. Fig. 2 shows a cutting board viewed from the side, part of the rear frame piece being removed. Fig. 3 shows a partial section of the cutting board on line A—A in Fig. 1. Fig. 4 shows the upper left corner of a cutting board.

Thus, Fig. 4 corresponds with Fig. 1. The essential difference is that in a cutting board according to Fig. 4 the recesses in the board are located nearer to the frame pieces or outer edges of the box. Figs. 5 and 6 show on a very small scale a modified embodiment of a cutting board in plan view and cross section respectively. The cross section in Fig. 6 is taken on line B—B in Fig. 5.

1 indicates a cutting plate provided with oblong, round or otherwise formed recesses 2. 3 is a box located under the cutting plate, the said box serving to collect the crumbs falling through the recesses of the cutting plate. The side edges of the cutting plate are indicated with 4. 5 are sliding rails provided in these side edges, the said sliding rails being adapted to run in recesses 6 in the frame and side pieces 7 of the box. The rear frame piece of the cutting board is indicated by 8 and its front frame piece by 9. A hole 10 serving to hang up the cutting board traverses the front portion of the cutting plate and the front frame piece 9. A plate 11 is fixed under the frame pieces 4, 8 and 9. 14 and 15 are pockets in which crumbs or the like can be gathered at the tilting of the cutting board in one direction or the other. Thus, the crumbs are prevented from falling out of the box. 16 is a piece of wood superimposed on the pocket 14.

In the modified embodiment of a cutting board according to the invention the reference numeral 12 in Fig. 6 indicates a notch in the upper edge of the side pieces, in which notches the recessed cutting plate is simply laid down and can be maintained by means of any suitable and simple locking device 13.

Many of the details of the invention can be varied without going beyond the principle of the invention. The essential feature of the device according to the invention is that it is provided with a cutting plate letting through crumbs and the like. The cutting board may be of any appearance, shape, material, and so on.

Having now described my invention, what I claim as new and desire to secure by Letters Patent is:

1. A bread cutting board with crumb tray comprising a base shaped as a substantially open-top box and a removable rigid cover for said box, said cover having a substantially plane top surface to support the bread loaf or cake to be cut and being provided with a plurality of parallel slots through which crumbs can fall into said box, a small part of the cover near one edge thereof being imperforate transversely of the apertures to form, with the part of the box underneath said imperforate cover part, a pocket in which crumbs which have fallen into the box are collected on tilting of the latter, the said walls of the box being provided with longitudinal grooves near their upper edges, and the removable cover carrying on its side edges guide rails slidably fitting into said grooves so that the box may be opened for the removal of crumbs therefrom without a complete separation of the cover from the box.

2. A bread cutting board with crumb tray comprising a base shaped as a substantially open-top box and a removable rigid cover for said box, said cover having a substantially plane top surface at a height at least on the level of the upper edges of the box to support the bread loaf or cake to be cut and being provided with a plurality of parallel slots through which crumbs can fall into said box, a small part of the cover near one edge thereof being imperforate transversely of the apertures to form, with the part of the box underneath said imperforate cover part, a pocket in which crumbs which have fallen into the box are collected on tilting of the latter, the said walls of the box being provided with longitudinal grooves near their upper edges, and the removable cover carrying on its side edges guide rails slidably fitting into said grooves so that the box may be opened for the removal of crumbs therefrom without a complete separation of the cover from the box.

ARNOLD HALFDAN ERICSSON.

REFERENCES CITED

The following references are of record in the file of this patent:

UNITED STATES PATENTS

| Number | Name | Date |
| --- | --- | --- |
| 1,313,900 | Kling | Aug. 26, 1919 |
| 1,315,101 | Ehrke | Sept. 2, 1919 |
| 1,481,030 | Schickerling | Jan. 15, 1924 |
| 1,745,805 | Miller | Feb. 4, 1930 |
| 1,776,961 | Vielbig | Sept. 30, 1930 |
| 2,199,917 | Janes | May 7, 1940 |

FOREIGN PATENTS

| Number | Country | Date |
| --- | --- | --- |
| 7,856 | Great Britain | Apr. 3, 1913 |